United States Patent [19]
Chan

[11] Patent Number: 5,268,794
[45] Date of Patent: Dec. 7, 1993

[54] ZOOM LENS ASSEMBLY

[75] Inventor: Kwok Y. Chan, Hong Kong, Hong Kong

[73] Assignee: W. Haking Enterprises Limited, Hong Kong, Hong Kong

[21] Appl. No.: 927,209

[22] Filed: Aug. 7, 1992

[30] Foreign Application Priority Data
Aug. 15, 1991 [GB] United Kingdom ............... 9117586

[51] Int. Cl.$^5$ .............................. G02B 15/14
[52] U.S. Cl. ........................... 359/699; 359/826
[58] Field of Search ............ 359/699, 700, 701, 702, 359/703, 822, 823, 825, 826

[56] References Cited
U.S. PATENT DOCUMENTS

| | | |
|---|---|---|
| 3,744,884 | 7/1973 | Filopovich et al. .............. 359/826 |
| 4,255,020 | 3/1981 | Yukio .............................. 359/699 |
| 4,763,999 | 8/1988 | Lawther ........................... 359/699 |
| 4,834,514 | 5/1989 | Atsuta et al. ..................... 359/703 |
| 4,993,815 | 2/1991 | Yamazaki et al. ................. 359/699 |
| 5,037,187 | 8/1991 | Oda et al. ......................... 359/699 |

Primary Examiner—Loha Ben
Attorney, Agent, or Firm—Mason, Kolehmainen, Rathburn & Wyss

[57] ABSTRACT

A zoom lens assembly for a camera includes front and rear lens assemblies and a cam assembly mounted in a cylindrical lens barrel. Rotation of the cam assembly results in axial movement of the lens assemblies and change of the focal length. The cam assembly includes discrete front and rear sections respectively defining front lens and rear lens cam surfaces. The sections are attached together with the lens assemblies captured internally. Integral projections on the front lens assembly engage the front lens cam surface and axial grooves in the barrel. Integral projections on the rear lens assembly engage the rear lens cam surface and axial grooves in the front lens assembly. A coil spring urges the lens assemblies apart and against the cam surfaces.

11 Claims, 3 Drawing Sheets

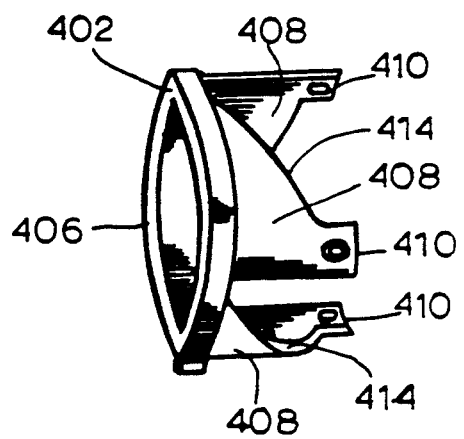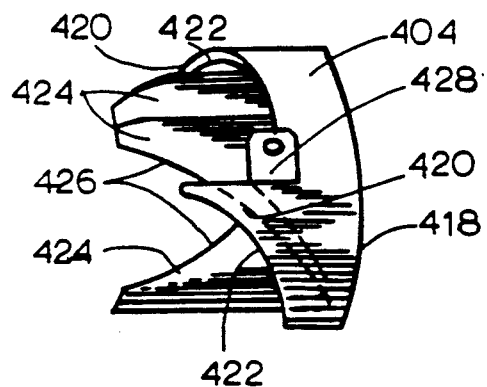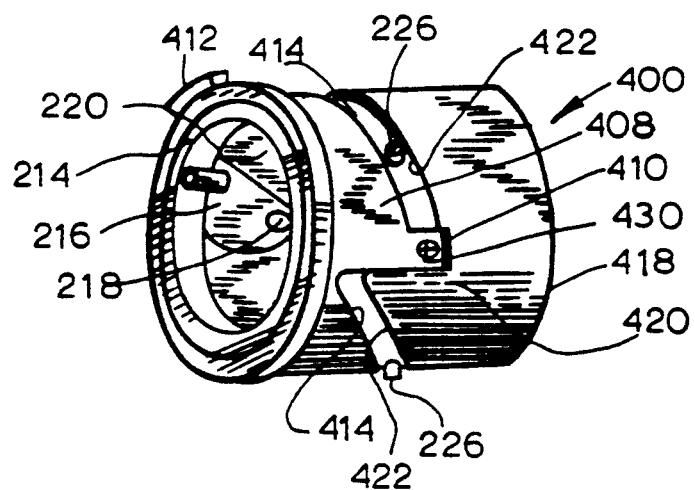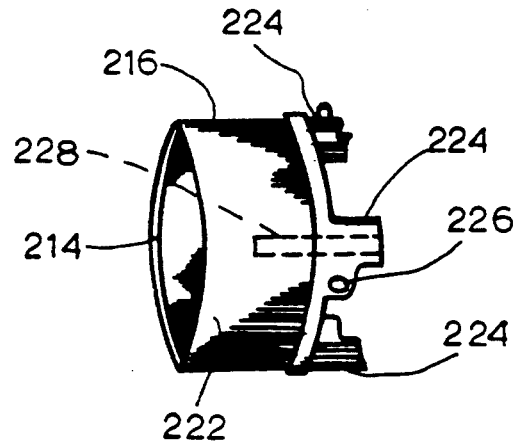

ZOOM LENS ASSEMBLY

FIELD OF THE INVENTION

The present invention relates to zoom lens assemblies for cameras and particularly to a zoom lens assembly that is compact and inexpensive to make.

DESCRIPTION OF THE PRIOR ART

An objective lens of the type known as a zoom lens has an adjustable lens system to permit a camera to create an image of a subject having a selected size by varying the focal length without moving closer to or farther from the subject. Known zoom lens systems include at least two lens groups—a front group located along the optical axis closer to the subject and a rear lens group located along the optical axis closer to the film plane. When the focal length is varied, the lens groups move relative to one another. In addition, in order to maintain proper focus at different focal lengths, the rear lens group is moved relative to the film plane. The lenses must be maintained perpendicular to the optical axis to prevent optical distortion, and their axial positions must be accurately determined. Various types of assemblies and cam arrangements have been incorporated into known zoom lens assemblies for accomplishing the complex motions of the lens groups.

One type of zoom lens assembly in common use includes a cylindrical zoom lens barrel that is fixed to a camera housing with a cylindrical zoom cam sleeve mounted for rotation within the barrel. Front and rear spiral slots are defined in the wall of the zoom cam sleeve, and axially extending grooves are defined in the lens barrel. Front and rear lens groups including front and rear lens holders are captured within the barrel and cam sleeve. The lens holders include radially extending guide pins that extend through the cam slots and into the axial grooves. When the cam is rotated, the front and rear cam slots control the axial movement of the front and rear lens holders while the engagement of the guide pins in the axial slots of the barrel prevents the lens groups from rotating.

Known zoom cam assemblies of this type are expensive to make and difficult to assemble. The expense results in large measure from the requirement for precision cam slots. Precise fabrication of the cam slots is necessary for accurate axial positioning of the lens groups. Precise size of the cam slots in relation to the guide pins is necessary to prevent undesirable binding or looseness of the pins in the slots. To achieve the necessary high degree of accuracy, the cam sleeve is made by machining, and less expensive manufacturing techniques such as plastic molding cannot be used. In addition, because the lens holder guide pins extend radially out through slots in the cam sleeve, the pins cannot be made as integral parts of the lens holders.

U.S. Pat. No. 4,763,999 discloses a zoom lens assembly in which the necessity for precision slots in a cam sleeve is avoided by using a cam plate that is moved in a linear direction transverse to the optical axis. A spring urges front and rear lens holders against opposite sides of the cam plate. This lens mechanism requires a large amount of space because of the linear cam movement, and requires additional structure to shield the film from incident light. In addition, the assembly disclosed in this patent cannot be compactly made as an independently assembled and tested subassembly for later mounting onto a camera housing U.S. Pat. No. 4,993,815 discloses a zoom lens assembly including three or more lens groups, two of which are at opposite sides of a differential cam. A pair of springs is required to bias the lens holders against the differential cam. The cam is mounted for both rotation and for axial movement, and difficult to produce internal spiral slots and helical threads are required.

SUMMARY OF THE INVENTION

Among the principal objects of the present invention are to provide a zoom lens assembly that is simple, compact, accurate and easy to manufacture and to assemble; to provide a zoom lens assembly wherein complex motions of parts are minimized and expensive machined parts such as precision cam slots or internal spiral slots are not required; to provide an assembly in which the motion controlling cam elements can be made by an inexpensive process such as plastic molding; to provide an assembly in which a single compression spring provides all necessary biasing forces; to provide an assembly that is light tight; to provide an assembly in which either a mechanically or electronically operated shutter can be used; and to provide a zoom lens assembly that overcomes disadvantages of assemblies used in the past In accordance with the invention there is provided a zoom lens assembly for use with a camera having a housing with a film plane perpendicular to an optical axis of the camera. The zoom lens assembly includes a cylindrical lens barrel adapted to be affixed to the camera housing to support the barrel around the optical axis with a rear end adjacent the film plane and a front end remote from the film plane. An axially extending lens guide structure is provided along the interior of the lens barrel. A front lens assembly including a front lens holder and a rear lens assembly including a rear lens holder are mounted within the lens barrel and include radially extending guide structures mechanically coupled to the axially extending lens guide structure for constraining the lens holders to move only in the axial direction without rotating. A rotatable cylindrical lens cam is telescoped within the lens barrel and surrounds the front and rear lens holders. The lens cam defines front and rear cams cooperating with the front and rear lens guide structures for moving the lens holders axially in response to rotation of the lens cam. The lens cam includes a front section having a rearwardly facing front lens cam surface and a rear section having a forwardly facing rear lens cam surface. The lens cam is prevented from moving axially. A spring held in compression between the front and rear lens holders biases the front and rear guide structures respectively against the front and rear lens cam surfaces. The front and rear lens cam sections are discrete parts that are held in assembly relative to one another with the front and rear lens holders and the spring captured therebetween.

BRIEF DESCRIPTION OF THE DRAWINGS

The invention and the above and other objects and advantages may best be understood from the following detailed description of the embodiment of the invention shown in the accompanying drawings, wherein:

FIG. 5 is a perspective view of the front section of the lens cam of the lens assembly;

FIG. 6 is a perspective view of the rear section of the lens cam of the lens assembly;

FIG. 7 is a perspective view of the lens cam assembled with internal components; and FIG. 8 is a perspective view of the rear housing of the front lens assembly.

DETAILED DESCRIPTION OF THE INVENTION

Figure 1:
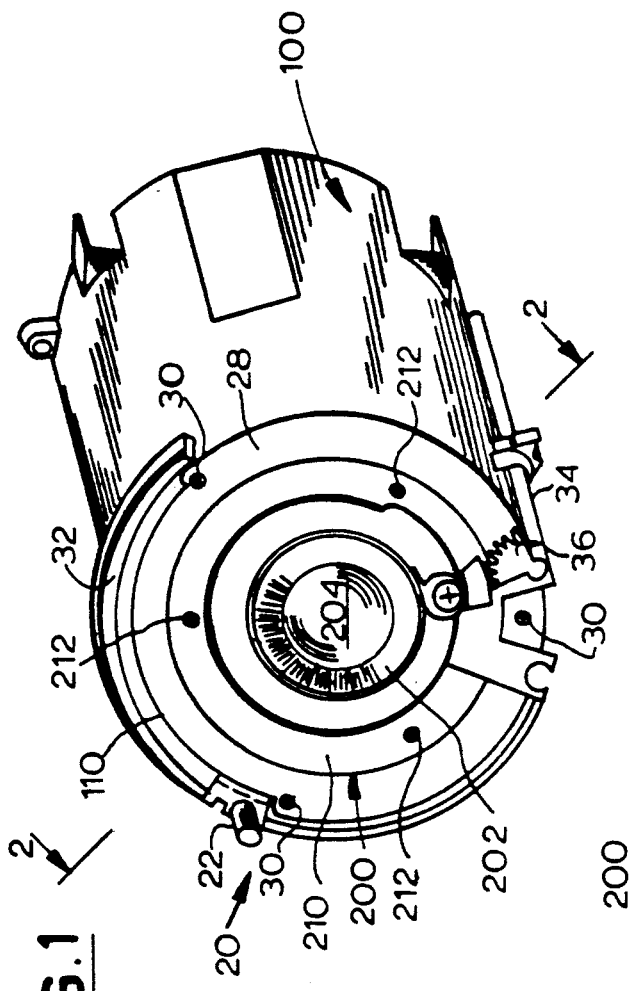
FIG. 1 is a perspective view of a zoom lens assembly in accordance with the present invention.

Having reference now to the drawings, there is shown a zoom lens assembly constructed according to the principles of the present invention and designated as a whole by the reference character 20. In general, the zoom lens assembly 20 includes a lens barrel or housing 100, an axially movable front lens assembly 200, an axially movable rear lens assembly 300 and a rotatable zoom cam assembly 400. When the user rotates a zoom control lever 22, the cam assembly 400 moves the front and rear lens assemblies 200 and 300 relative to the barrel 100 and relative to one another in order to vary the focal length and thus the size of the image provided by the lens assembly.

Figure 4:
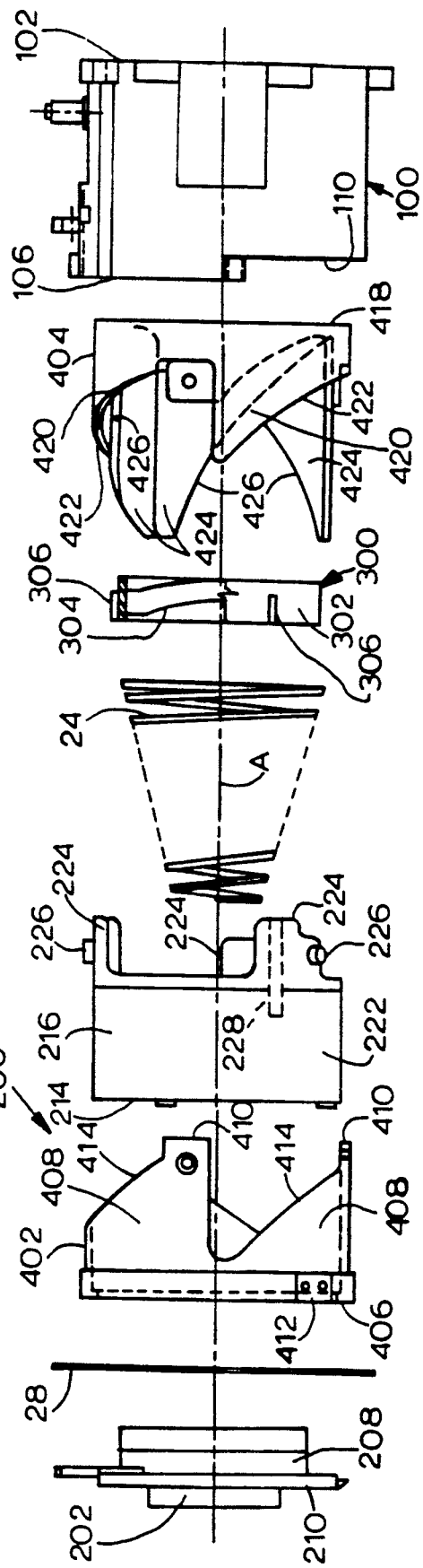
FIG. 4 is an exploded side view of components of the zoom lens assembly.

The lens barrel 100 is generally cylindrical and coaxial with the optical axis indicated by the line A in FIG. 4. A rear end wall 102 is adapted to be fixed to the housing of a camera, parallel to and spaced from the plane of film to be exposed with an image received through the lens assembly. The light enters the camera housing through an opening 104 in the wall 102. An open forward end 106 of the barrel 100 projects away from the camera and toward the subject to be photographed. Lens guide grooves 108 extend in the axial direction along the inner wall of the barrel 100 and function in cooperation with other components described below to permit the front and rear lens assemblies to move axially while preventing rotation. Three axial guide grooves 108 are arrayed at equal angular positions around the barrel 100. A recess 110 is provided in the forward end 106 to limit rotation of the cam assembly 400.

Front lens assembly 200 includes a lens holder 202 supporting at least one optical lens element 204 perpendicular to the optical axis. A shutter mechanism (not shown) is included within the lens holder 202 for mechanical or, if desired, remote electronic operation. Holder 202 is threaded into a central hub portion 206 of a forward front lens housing 208, and a flange portion 210 of the forward housing 208 is attached by fasteners 212 to an outer collar 214 of a rear housing 216 of the front lens assembly. An opening 218 in a central wall 220 permits light to pass from the front lens assembly 200 to the rear lens assembly 300. A rearwardly extending cylindrical wall 222 of the rear housing 216 includes three equally spaced extensions 224. Each extension 224 carries an integral radially extending guide projection 226 formed of one piece with the housing 216. The ends of the projections 226 are received in the axial guide grooves 108 in the lens barrel 100. Engagement of the projections 226 in the grooves 108 prevents rotation of the front lens assembly 200 while permitting axial movement. Axial guide grooves 228 extend along the interior surface of the wall 222 and extensions 224.

Rear lens assembly 300 includes a support ring or lens holder 302 in which is mounted at least one lens element 304. Three guide tabs 306 are formed integrally as part of the same piece as and extend radially from the ring 302. The ends of the guide tabs 306 are received in the axial guide grooves 228. Because the front lens assembly 200 cannot rotate, engagement of the tabs 306 in the grooves 228 prevents rotation of the rear lens assembly 300 while permitting it to move axially.

Cam assembly 400 includes a discrete front cam section 402 and a separate and discrete rear cam section 404. Front section 402 includes an annular forward portion 406 and three rearwardly extending legs 408 each terminating in a attachment tab 410. A mounting projection 412 on the forward portion permits attachment of the zoom lever 22 so that the cam assembly can be rotated in order to vary the focal length. Each leg 408 defines a rearwardly facing front lens cam surface 414 engaged by the base portions of the radial guide projections 226. Engagement of the projections 226 with the cam surfaces 414 permits accurate positioning of the front lens assembly in response to rotation of the cam assembly 400.

Rear cam section 404 includes an annular rear base 418. Three equally spaced outer wall extensions 420 extend forwardly from the base 418. These terminate in edges 422. Three equally spaced inner wall extensions 424 extend forwardly from the base 418, and each extension 424 defines a forwardly facing rear lens cam surface 426. The rear lens cam surfaces 426 are engaged by the base portions of the radial guide tabs 306. Engagement of the tabs 306 with the cam surfaces 426 permits accurate positioning of the rear lens assembly 300 in response to rotation of the cam assembly 400. Attachment pads 428 (FIG. 6) are defined near the annular base 418 between each pair of the extensions 420 and 424.

The front and rear cam sections 402 and 404 are attached to one another to form the cam assembly 400. When they are assembled together, the rear housing 216 of the front lens assembly 200 is captured between the sections 402 and 404. The attachment tabs 410 are located on the attachment pads 428 and secured with fasteners 430 (FIG. 7). In the assembled relationship, the legs 408 of the front section 402 lie in the same cylindrical plane as the outer wall extensions 420 of the rear section 404. A space exists between this cylindrical plane and the concentric cylindrical plane of the inner wall extensions 424. In some positions of the lens assembly 20 as seen for example in FIG. 2, the cylindrical wall 222 and extensions 224 of the front lens housing are received in this cylindrical space. This provides a compact nested or telescoped arrangement.

The front lens cam surfaces 414 and the edges 422 cooperate to define generally spiral slots through which the radial projections 226 extend (FIG. 7). Sufficient clearance is provided so that the projections 226 do not engage the edges 422 and the movement of the front lens assembly is controlled only by the front lens cam surfaces 414. This eliminates possible interference or binding of the projections 226 in the slots and eliminates the need for slots having precise widths.

A single spring 24 holds the guide tabs 306 continuously in contact with the rear lens cam surfaces 426 and also holds the guide projections 226 in continuous contact with the front lens cam surfaces 414. Spring 24 is a generally frustoconically shaped coil spring surrounding the optical axis and located radially outside of the light path. The spring 24 is in compression with its larger diameter end against the rear lens assembly 300 and its smaller end against the front lens assembly 200. In all positions of the zoom lens assembly, the spring urges the rear lens assembly 300 rearward in the axial direction and urges the front lens assembly 200 forward in the axial direction.

An advantage of the zoom lens assembly 20 is that it is inexpensive to manufacture and easy to assemble. Closed precision slots, internal spiral grooves and similar difficult to manufacture structural elements are avoided and the front and rear cam sections 402 and 404, the lens barrel 100 and the front lens rear housing 216, as well as other components if desired, can be made in an inexpensive manner by molding of plastic. No complex mold coring or precision machining is necessary.

Expensive and difficult assembly is also avoided because the radial projections 226 and radial tabs 306 can be formed integrally and of the same piece as the rear front lens housing 216 and rear lens ring 302. This construction is possible because the cam assembly 400 includes two sections 402 and 404 that are discrete elements assembled together around the front and rear lens assemblies 200 and 300.

Manufacture of the zoom lens assembly 20 and of cameras incorporating the assembly is facilitated by the use of subassemblies of components. In assembling the elements of the assembly, the front and rear zoom cam sections 402 and 404 can be attached together with the housing 216 captured in place between them. The spring 24 and rear lens assembly 300 can also be included in this subassembly. Other components such as the remaining parts of the front lens assembly 200 and the lens barrel 100 can be added later. This intermediate subassembly is seen in FIG. 7.

When the front lens assembly is completed, and the components are inserted into the lens barrel, a retainer ring 28 is attached to the forward end 106 of the barrel by fasteners 30 to hold the components in assembly. A frame 32 having the general shape of a circular segment and including the zoom lever 22 is attached to the attachment block 412 of the cam assembly. A mechanical shutter linkage including a shaft 34 and gear segment 36 is mounted on the barrel 100. If preferred, a motor drive can be used to rotate the zoom cam assembly and an electronically operated shutter can be used. The completed zoom lens assembly 20 as seen in FIG. 1 is an operable and light tight unit that can be tested and held for assembly with a camera housing at a desired time and place.

Figure 2:
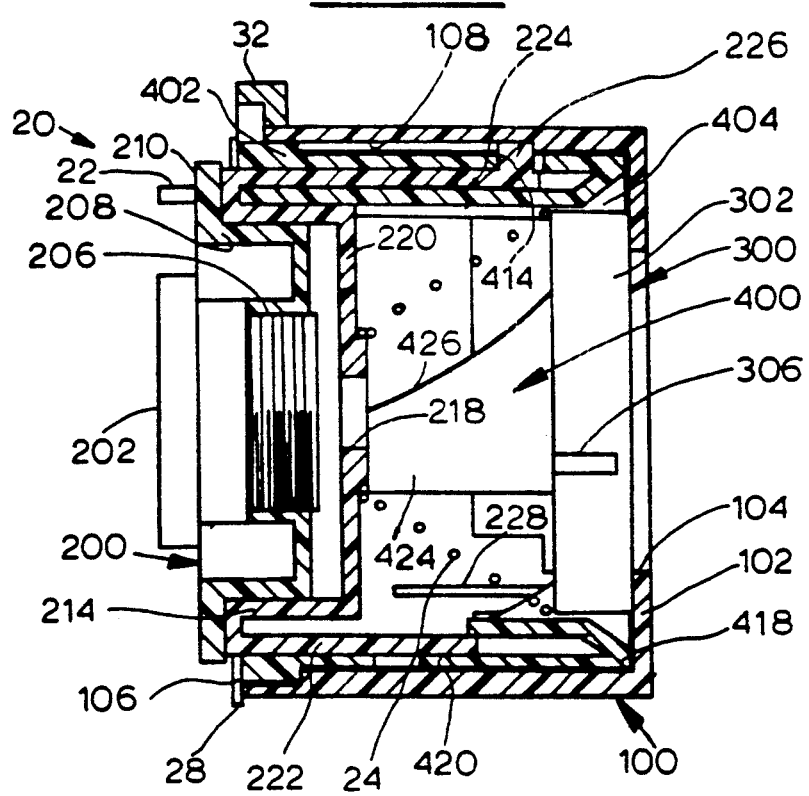
FIG. 2 is a cross sectional view of the lens assembly taken along the line 2—2 of FIG. 1 with the components shown in the minimum focal length position.
Figure 3:
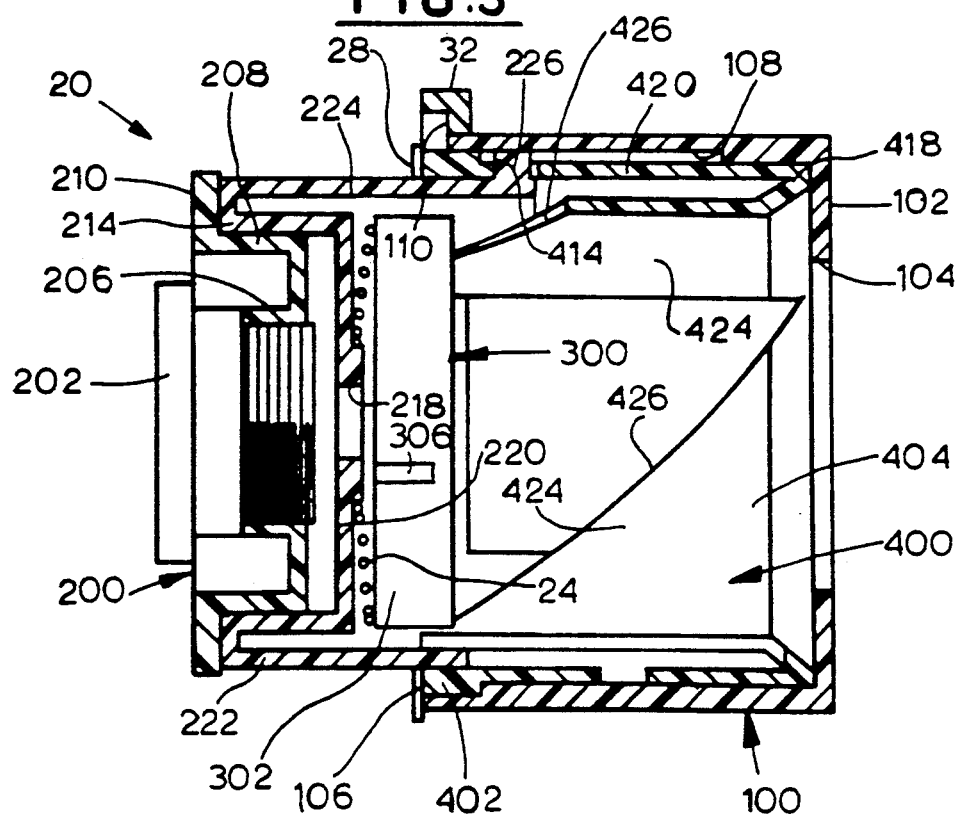
FIG. 3 is a view similar to FIG. 2 showing the components in the maximum focal length position.

In operation, the zoom lens assembly 20 can be adjusted by manual or motor driven operation continuously between the minimum focal length position of FIG. 2 and the maximum focal length position of FIG. 3. The cam assembly 400 is rotatable within the lens barrel 100, but is held axially between the ring 28 and the barrel end wall 102. Rotational motion is limited to the angular circumferential length of the cam surfaces 414 and 426 by engagement of the mounting block 412 with the recess 110 in the forward end of the lens barrel 100.

When the cam assembly 400 is rotated, engagement of the cam surfaces 414 and 426 with the projections 226 and 306 causes the front and rear lens assemblies to move in the axial direction along the optical axis. Rotation of the lens assemblies is prevented by the guide grooves 108 in the barrel 100. The front lens assembly 200 is directly prevented from rotating because the ends of the projections 226 are received directly into the grooves 108. The rear lens assembly 300 is indirectly prevented from rotating because the ends of the tabs 306 are received into the grooves 228 in the front lens assembly 200. The telescoping or nesting of the components of the assembly, and the indirect radial restraint of the rear lens assembly 300 provides a very compact unit.

While the invention has been described with reference to details of the illustrated embodiment, these details are not intended to limit the scope of the invention as defined in the following claims.

I claim:

1. A zoom lens assembly for use with a camera defining a film plane perpendicular to an optical axis, said zoom lens assembly comprising:
    a cylindrical lens barrel adapted to be affixed to the camera housing to support the barrel around the optical axis with a rear end adjacent the film plane and a front end remote from the film plane;
    axial lens guide means provided along the interior of said lens barrel;
    front lens means including a front lens holder and rear lens means including a rear lens holder, said front and rear lens holders being mounted within said lens barrel and including radially extending guide means mechanically coupled to said axial lens guide means for constraining said lens holders to move only in the axial direction without rotating; and
    a rotatable cylindrical lens cam assembly telescoped within said lens barrel and surrounding said front and rear lens holders, said lens cam assembly defining front and rear cams cooperating with said radially extending guide means of said front and rear lens holders for moving said lens holders axially in response to rotation of said lens cam assembly;
    the zoom lens assembly being characterized by:
    said lens cam assembly includes a front section having a rearwardly facing front lens cam surface and a rear section having a forwardly facing rear lens cam surface;
    means for limiting range of axial movement of said lens cam assembly;
    a spring held in compression between said front and rear lens holders for biasing said radially extending guide means of said front and rear lens holders respectively against said front and rear lens cam surfaces; and
    said front and rear lens cam sections being discrete parts that are held in assembly relative to one another and to said front and rear lens holders with said spring being captured therebetween.

2. A zoom lens assembly as claimed in claim 1, said front and rear lens cam sections being fastened together and mounted within said lens barrel.

3. A zoom lens assembly as claimed in claim 2, said guide means of said front and rear lens means comprising radially extending elements.

4. A zoom lens assembly as claimed in claim 3, the radially extending elements of at least one of said lens means being captured between said front and rear cam sections.

5. A zoom lens assembly as claimed in claim 4, said captured elements being formed of one piece with a housing of one said zoom lens assembly.

6. A zoom lens assembly as claimed in claim 2, said front and rear lens cam sections being made of molded plastic.

7. A zoom lens assembly as claimed in claim 6, said guide means of said front and rear lens holders comprising radially extending elements made integrally and of one piece with said lens holders.

8. A zoom lens assembly as claimed in claim 1, said axial lens guide means comprising first axial slots in said barrel, said front lens guide means comprising projections engaging both said front lens cam surface and said first axial slots.

9. A zoom lens assembly as claimed in claim 8, said front lens means including second axial slots, said rear lens guide means comprising tabs engaging both said rear lens cam surface and said second axial slots.

10. A zoom lens assembly as claimed in claim 8, said projections being captured between said front and rear lens cam sections.

11. A zoom lens assembly as claimed in claim 1 wherein said spring comprises a coil spring disposed within said barrel around the optical axis and outside of the path of light through the lens assembly.

* * * * *